United States Patent [19]

Björkman et al.

[11] Patent Number: 5,246,527
[45] Date of Patent: Sep. 21, 1993

[54] FOIL-WELDING ARRANGEMENT

[75] Inventors: Claes Björkman, Essingeringen; Leif Lundblad, Djurgardsslätten; Tord Pettersson, Skolvägen, all of Sweden

[73] Assignee: NYBO Seal System A.B., Stockholm, Sweden

[21] Appl. No.: 886,343

[22] Filed: May 20, 1992

[30] Foreign Application Priority Data

May 21, 1991 [SE] Sweden .............................. 9101529

[51] Int. Cl.$^5$ .............................................. B32B 31/20
[52] U.S. Cl. .................................. 156/459; 156/308.4; 156/510; 156/555; 156/583.1; 156/583.2
[58] Field of Search ............... 53/553; 156/290, 308.4, 156/543, 554, 555, 183, 206, 207, 211, 269, 324, 510, 515, 518, 583.1, 462, 459, 583.2; 493/189, 199, 208, 223, 237, 341, 201, 202, 203; 219/243, 244

[56] References Cited

U.S. PATENT DOCUMENTS

| | | | |
|---|---|---|---|
| 2,127,183 | 8/1938 | Moore | 219/244 |
| 2,430,920 | 11/1947 | Dodge | 156/579 |
| 2,627,150 | 2/1953 | Cheney et al. | 53/553 |
| 2,730,852 | 1/1956 | Clark | 493/203 |
| 2,779,851 | 1/1957 | Vogt | 219/244 |
| 2,803,931 | 8/1957 | David . | |
| 2,924,694 | 2/1960 | Kreider | 493/341 |
| 2,982,066 | 5/1961 | Thompson, Jr. . | |
| 3,109,764 | 11/1963 | Natelli . | |
| 4,085,560 | 4/1978 | McClosky . | |
| 4,631,905 | 12/1986 | Maloney . | |
| 5,031,379 | 7/1991 | Lundblad et al. . | |

FOREIGN PATENT DOCUMENTS

| | | |
|---|---|---|
| 0003513 | 8/1979 | European Pat. Off. . |
| 51-71378 | 6/1976 | Japan . |
| 450946 | 8/1987 | Sweden . |

Primary Examiner—Michael W. Ball
Assistant Examiner—Richard Crispino
Attorney, Agent, or Firm—Simmons, Perrine, Albright & Ellwood

[57] ABSTRACT

An arrangement for welding foil webs includes two coacting cog wheels, between which the foil webs are advanced, and a heat source. The heat source is comprised of a heating wire which is placed in the close proximity of the coacting parts of the cog wheels and the ends of which are connected to a current source which functions to heat the wire to a temperature above the softening temperature of the foil webs. The cog wheels will therewith function as a web-advancing mechanism and also as part of a web-welding mechanism.

6 Claims, 2 Drawing Sheets

FOIL-WELDING ARRANGEMENT

The present invention relates to a foil-welding arrangement for welding together foil webs and comprising two coacting cog wheels between which said webs are advanced, and a heating source. The arrangement is suitable for use, for instance, in an enveloping machine according to U.S. Pat. No. 5,031,379 intended for enveloping messages or documents received on a telefax machine, or for enveloping copies from a copying machine.

When wishing to weld foil webs together, there is generally used a technique known as intermittent seam welding, i.e. a technique which comprises the steps of moving two jaws towards one another with the foil webs located between the jaws, welding the foil webs by heat emitted form the jaws, separating the jaws, and advancing the foil webs through a distance corresponding to the length dimension of respective jaws in the welding direction. This technique places high demands on the mechanics of the jaws, requires high heating currents and separate mechanics for advancing the foil sheets.

According to the present invention there is provided an arrangement of the type defined above, in which the heating source is comprised of a heating wire placed in the close proximity of the coacting parts of the cog wheels, and in which the ends of the heating wire are connected to a current source which is operative to heat the wire to a temperature above the softening temperature of the foil webs.

These and other characteristic features of an inventive arrangement are set forth in the following Claims.

BRIEF DESCRIPTION OF THE DRAWINGS

The invention will now be described in more detail with reference to the accompanying schematic drawings, in which.

Figure 1:
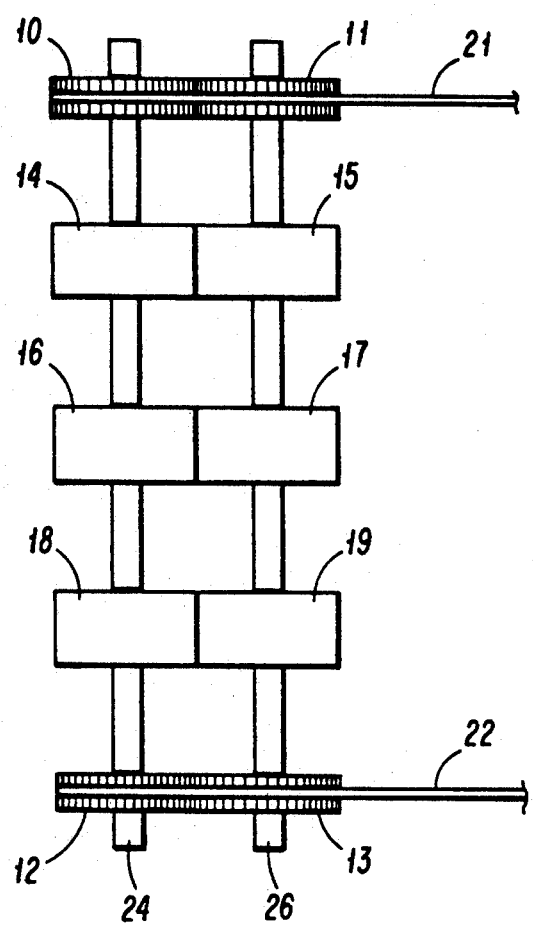
FIG. 1 illustrates an arrangement comprising two pairs of cog wheels and three pairs of drive rollers.

The arrangement illustrated in FIG. 1 includes a first pair of cog wheels 10, 11; a second pair of cog wheels 12, 13; and three pairs of drive rollers 14, 15; 16, 17; and 18, 19, The cog wheel 10, the drive rollers 14, 16, 18 and the cog wheel 12 are mounted on a first drive shaft 24 in the order stated. The cog wheel 11, the drive rollers 15, 17, 19 and the cog wheel 13 are mounted on a second drive shaft 26 in the order stated. All cog wheels are provided with a peripheral groove and each of two heating wires 21 and 22 is placed in a respective one of two of said peripheral grooves.

Figure 3:
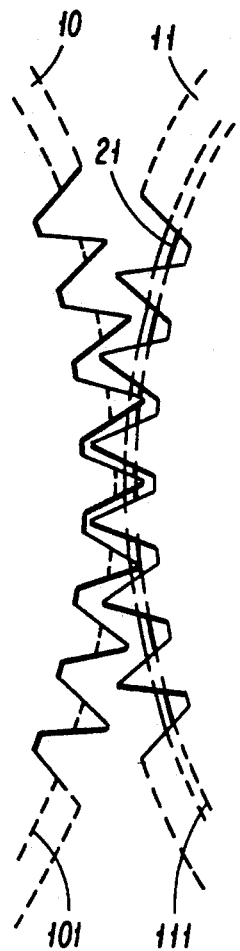
FIG. 3 illustrates part of the periphery of one cog-wheel pair which includes a groove for the accommodation of a heating wire.

FIG. 3 illustrates part of the periphery of the cog wheel 10 having a circular peripheral groove whose bottom is referenced 101, and part of the periphery of the cog wheel 11 provided with a circular peripheral groove whose bottom is referenced 111. By circular is meant here that the groove passes through all of the cogs or teeth of the cog wheel and also that the groove bottom forms part of a circle so that the groove is able to suitably receive a wire of round cross-section. In the case of the coacting pair of cog-wheels 10, 11, it is the groove of the cog wheel 11 which accommodates a heating wire 21. Similarly, it is the groove of the cog wheel 13 of the coacting cog-wheel pair 12, 13 which accommodates a heating wire 22. The ends of the wire 21 are referenced 211, 212.

Figure 2:
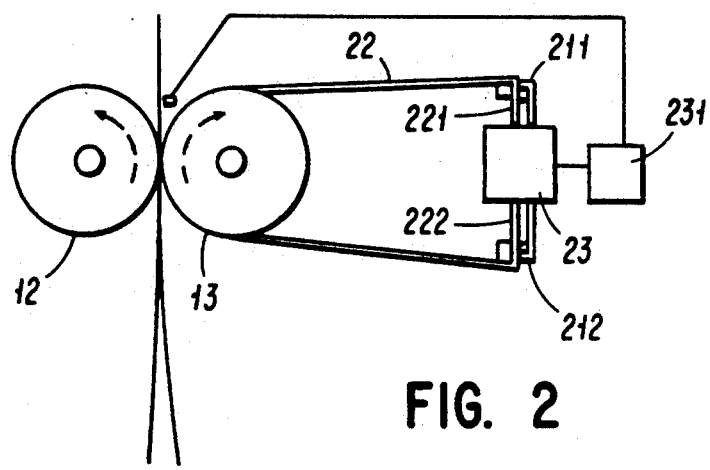
FIG. 2 is a side view of the arrangement illustrated in FIG. 1.

The ends of both heating wires are connected to a current source 23, see FIG. 2, for heating respective wires to a temperature above the softening temperature of the foil sheets. In the FIG. 2 illustration, the ends 221, 222 of the wire 22 are connected to the current source 23. This is a program-controlled unit which is constructed to deliver energy pulses having a voltage of about 10 volts. The arrangement includes a control device 231 which has a sensor positioned at the foil welding location and which causes the current source to deliver energy pulses so that the temperature at the foil welding location will lie within the range of 100° C.-120° C.

FIG. 2 shows two weldable plastic foil webs or sheets advanced slightly between the cog-wheel pairs and the drive rollers. The foil webs are welded together above the cog wheels 12, 13 and the hidden pairs of drive rollers and cog wheels and are separated in relation to one another beneath said cog-wheel pairs and drive-roller pairs. Because the cog wheels-rollers "grip" the mutually adjacent foil webs, as the webs advance, the webs will be pleated or corrugated between the teeth of the cog wheels (with drive on the shaft 24, 26) and welded together and suitably also perforated at the crests of the corrugations, which results in a particular pattern for the two longitudinally extending, parallel seams. The cog wheels may be manufactured from woven bakelite in order to avoid short circuiting.

The heating wires may comprise teflon-coated copper wires, diameter 0.7 mm.

It has been found in practice that the presence of the control means 231 and its sensor is not necessary when the energy supply to the heating wires is delivered in the form of a longer energy pulse (some seconds) over an initial starting period and when the pauses between the energy pulses then become progressively longer with the pauses being approximately twice as long as the duration of the energy pulses in the steady state condition.

The advantages afforded by the described welding arrangement are that:

No separate feeding mechanism is required for advancing the foil webs, since web advancement and web welding is effected with one and the same mechanism;

the arrangement requires less space than known arrangements of this kind, because of the fewer mechanical components;

less energy is consumed, because welding is effected and the foil web possibly perforated solely at the crests of the corrugated foil webs, and that welding can be effected more quickly than in the case of conventional methods since welding is effected continuously—in spite of the perforating technique—and not intermittently with the use of reciprocatingly moveable welding jaws.

Figure 4:
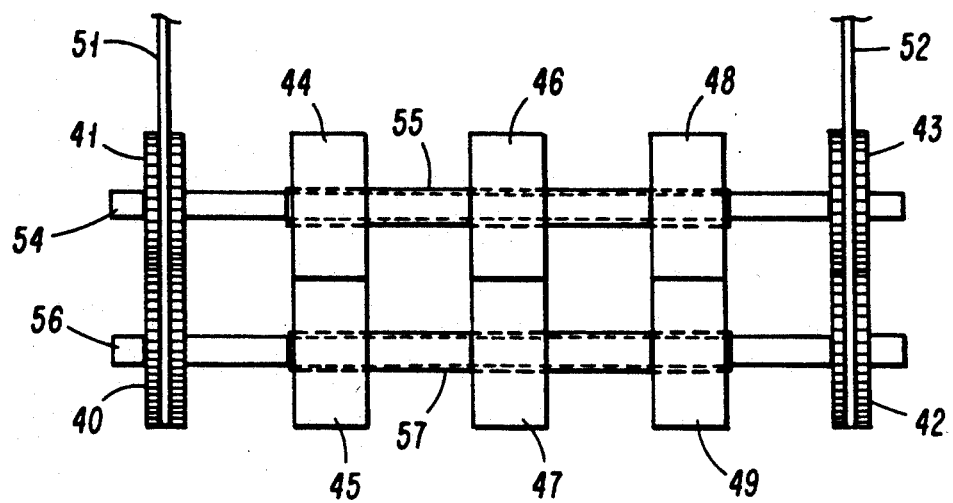
FIG. 4 illustrates a modification of the arrangement shown in FIG. 1.

The arrangement illustrated in FIG. 4 comprises two pairs of coacting cog wheels 40, 41 and 42, 43, and a heating wire 51 and 52 for each pair of cog wheels, said heating wires embracing a part of the periphery of a respective cog wheel 41 and 43. Arranged between said pairs of cog wheels are three pairs of coacting drive rollers 45, 44; 47, 46 and 49, 48. The cog wheels are mounted on two parallel drive shafts 56 and 54 respectively, and the drive rollers are mounted on two parallel and separately driven sleeves 57 and 55 respectively, each of which is coaxially mounted on a respective one of said drive shafts 56 and 54.

The drive shafts and the sleeves respectively are driven individually. It is suitable for the drive rollers (made of rubber) to be driven more rapidly than the cog wheels; a speed which is roughly 15% higher than the rotary speed of the cog wheels has been found suitable in practice.

Figure 5:
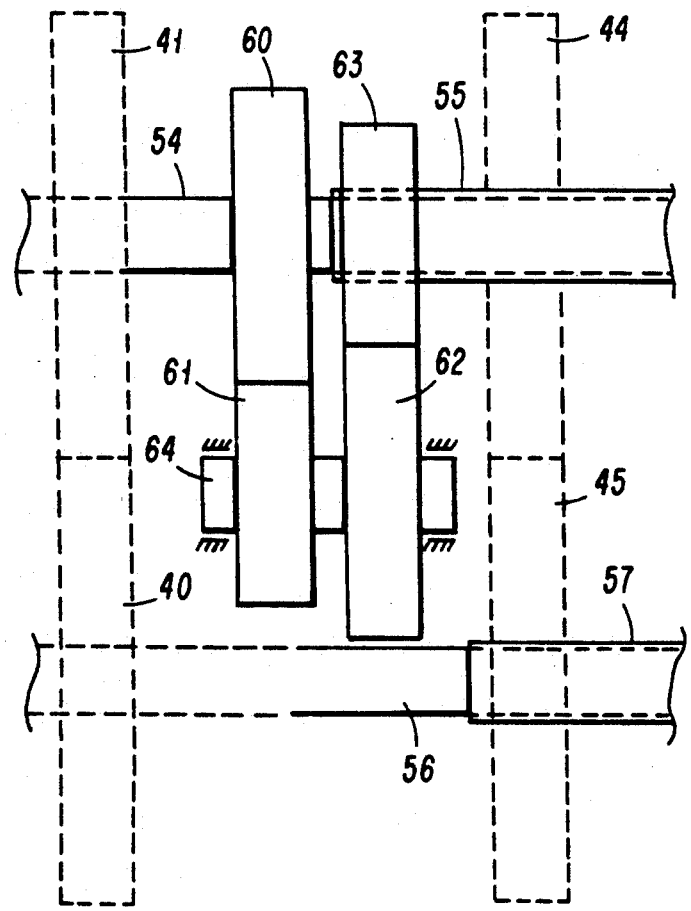
FIG. 5 illustrates schematically an arrangement for driving the shafts and sleeves.

FIG. 5 illustrates schematically an arrangement for driving the shafts and sleeves. The cog wheel 41 mounted on the shaft 54 is driven in a manner not clearly shown and therewith drives the cog wheel 40 and the shaft 56. Mounted on the drive shaft 54 is a gear wheel 60 which drives a smaller gear wheel 61 on a moveably journalled shaft 64. This shaft carries a further gear wheel 62, suitably of the same size as the gear wheel 60, and the gear wheel 62 drives, in turn, a smaller cog wheel 63 which is journalled on the sleeve 55. As a result of this gear arrangement, the sleeve 55—and therewith also the sleeve 57 via the drive rollers 44, 45, etc.—will rotate faster than the shaft 54.

The aforedescribed and illustrated embodiments have included grooved cog wheels, in which the grooves have been formed by milling, for instance. It is also conceivable, however, to use a cog wheel which comprises in principle two cog wheels and an intermediate annulus of slightly smaller diameter than the cog wheels. Another conceivable variant is a cog wheel with a flange whose diameter is slightly smaller than the diameter of the cog wheel. The variant chosen will be governed by manufacturing/technical and economical reasons, although it is essential that the variant chosen fulfils the condition that the heating wire will be active in the close vicinity of the coacting parts of the web-advancing cog wheels.

We claim:

1. An arrangement for welding together continuously moving foil webs at a foil welding location of a web advancing arrangement, the web advancing arrangement comprising a pair of parallel drive shafts and at least one pair of coacting cog wheels and drive rollers rotatably mounted on and supported by the pair of drive shafts, the cog wheels having peripheral grooves passing through teeth of the cog wheels and forming a peripheral wire-receiving cross-sectional passage for a wire to extend through a web-gripping engaging portion of the coacting cog wheels, a heating wire placed adjacent the respective pair of coacting cog wheels, the heating wire accommodated in part within the grooves of the respective cog wheels and embracing only part of the periphery of one of the pair of cog wheels at the foil welding location and throughput the web-gripping engagement of the coacting cog wheels, the heating wire having two ends, and a source connected across the two ends of the heating wire for providing a current for heating the heating wire to a temperature in a range of temperatures above a softening temperature of the foil webs.

2. An arrangement according to claim 1, wherein the source connected across the two ends of the heating wire comprises a pulsed source selectively providing energy pulses at a preselected voltage for heating the heating wire at the foil welding location to a temperature within a preferred range of temperatures.

3. An arrangement according to claim 1, wherein said arrangement includes two pairs of coacting cog wheels and each pair of coacting cog wheels has a respective heating wire which embraces a part of the periphery of a respective cog wheel, wherein there is arranged between said two pairs of coacting cog wheels at least two pairs of coacting drive rollers, and wherein the cog wheels and the drive rollers are mounted on two parallel drive shafts.

4. An arrangement according to claim 1, wherein the arrangement includes two pairs of coacting cog wheels and each pair of coacting cog wheels has a respective heating wire which embraces a part of the periphery of a respective cog wheel, wherein at least two pairs of coacting drive rollers are mounted between said two pairs of coacting cog wheels, and wherein the cog wheels are mounted on two parallel drive shafts and the drive rollers are mounted respectively on two parallel and separately-driven sleeves, each of which is mounted coaxially on a respective one of said drive shafts.

5. An arrangement according to claim 1, wherein the source is constructed to deliver energy pulses having a voltage of about 10 volts, and wherein the arrangement includes control means for controlling the delivery of energy pulses from the source such that the temperature at the web welding location will lie within the temperature range of 100° C.–120° C.

6. An arrangement according to claim 1, wherein the coacting parts of the cog wheels function to corrugate the foil webs, and wherein the heating wire is positioned so as to weld the foil webs at the crests of the corrugations thereof and optionally also to perforate the webs at said crests.

* * * * *

UNITED STATES PATENT AND TRADEMARK OFFICE
CERTIFICATE OF CORRECTION

PATENT NO.  : 5,246,527
DATED       : September 21, 1993
INVENTOR(S) : Bjorkman, et al It is certified that error appears in the above-identified patent and that said Letters Patent is hereby corrected as shown below:

Column 4, Line 27, "pairs of coasting drive"

should read, --pairs of coacting drive--

Column 4, Line 31, "pairs of coasting cog wheels"

should read, --pairs of coacting cog wheels--

Signed and Sealed this

Third Day of May, 1994

Attest:

BRUCE LEHMAN

Attesting Officer

Commissioner of Patents and Trademarks